US012424751B2

(12) United States Patent
Chang et al.

(10) Patent No.: US 12,424,751 B2
(45) Date of Patent: Sep. 23, 2025

(54) ELECTRONIC DEVICES

(71) Applicant: Advanced Semiconductor Engineering, Inc., Kaohsiung (TW)

(72) Inventors: Wei-Hao Chang, Kaohsiung (TW); Wei-Chun Lee, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 153 days.

(21) Appl. No.: 18/100,569

(22) Filed: Jan. 23, 2025

(65) Prior Publication Data

US 2024/0250427 A1 Jul. 25, 2024

(51) Int. Cl.

*H01Q 7/00* (2006.01)
*H01Q 1/38* (2006.01)
*H01Q 1/50* (2006.01)

(52) U.S. Cl.

CPC ................. *H01Q 7/00* (2013.01); *H01Q 1/38* (2013.01); *H01Q 1/50* (2013.01)

(58) Field of Classification Search

CPC .. H01Q 7/00; H01Q 1/38; H01Q 1/50; H01Q 1/243; H01Q 3/24; H01Q 19/30
USPC .......................................................... 343/702
See application file for complete search history.

(56) References Cited

U.S. PATENT DOCUMENTS

| | | | | |
|---|---|---|---|---|
| 7,602,340 B2 * | 10/2009 | Sato | H01Q 9/26 343/702 |
| 7,898,480 B2 * | 3/2011 | Ebling | H01Q 3/30 343/810 |
| 9,306,275 B2 * | 4/2016 | Mikata | H01Q 9/42 |
| 12,068,526 B2 * | 8/2024 | Lee | H01Q 5/35 |
| 2018/0269577 A1 * | 9/2018 | Kosaka | H01Q 5/48 |
| 2020/0028276 A1 * | 1/2020 | Watson | H01Q 9/145 |
| 2020/0227832 A1 * | 7/2020 | Nemoto | H01Q 1/38 |

FOREIGN PATENT DOCUMENTS

| | | | |
|---|---|---|---|
| TW | 200603485 A | 1/2006 | |
| WO | WO-2015160188 A1 * | 10/2015 | H01Q 1/243 |

* cited by examiner

*Primary Examiner* — Dimary S Lopez Cruz
*Assistant Examiner* — Brandon Sean Woods
(74) *Attorney, Agent, or Firm* — FOLEY & LARDNER LLP

(57) ABSTRACT

The present disclosure provides an electronic device. The electronic device includes an antenna. The antenna includes a first conductive element, a second conductive element, and a switch circuit. The first conductive element is configured to transmit a first signal along a first direction. The second conductive element is configured to transmit a second signal along a second direction different from the first direction. The switch circuit is configured to electrically couple a ground to the first conductive element and/or the second conductive element.

16 Claims, 9 Drawing Sheets

ELECTRONIC DEVICES

BACKGROUND

1. Field of the Disclosure

The present disclosure generally relates to an electronic device and in particular to an electronic device including an antenna.

2. Description of the Related Art

To reduce the size and achieve higher integration of electronic device packages, several packaging solutions have been developed and implemented, such as antenna in package (AiP) and antenna on package (AoP). However, to support the industry's demand for increased electronic functionality, the size and/or form factor of the electronic device packages will inevitably be increased, and some applications may be limited (e.g., in portable devices).

SUMMARY

In some embodiments, an electronic device includes an antenna. The antenna includes a first conductive element, a second conductive element, and a switch circuit. The first conductive element is configured to transmit a first signal along a first direction. The second conductive element is configured to transmit a second signal along a second direction different from the first direction. The switch circuit is configured to electrically couple a ground to the first conductive element and/or the second conductive element.

In some embodiments, an electronic device includes a first conductive element and a second conductive element. The first conducive element is configured to function as a first reflector or a first director. The second conductive element is configured to function as a second reflector or a second director. When the first conductive element functions as the first reflector, the second conductive element functions as the second director. When the second conductive element functions as the second reflector, the first conductive element functions as the first director.

In some embodiments, an electronic device includes a carrier, an antenna, and an electronic component. The antenna is disposed within the carrier. The electronic component is electrically coupled to the antenna and configured to determine that a radiation direction of a first signal from the antenna

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
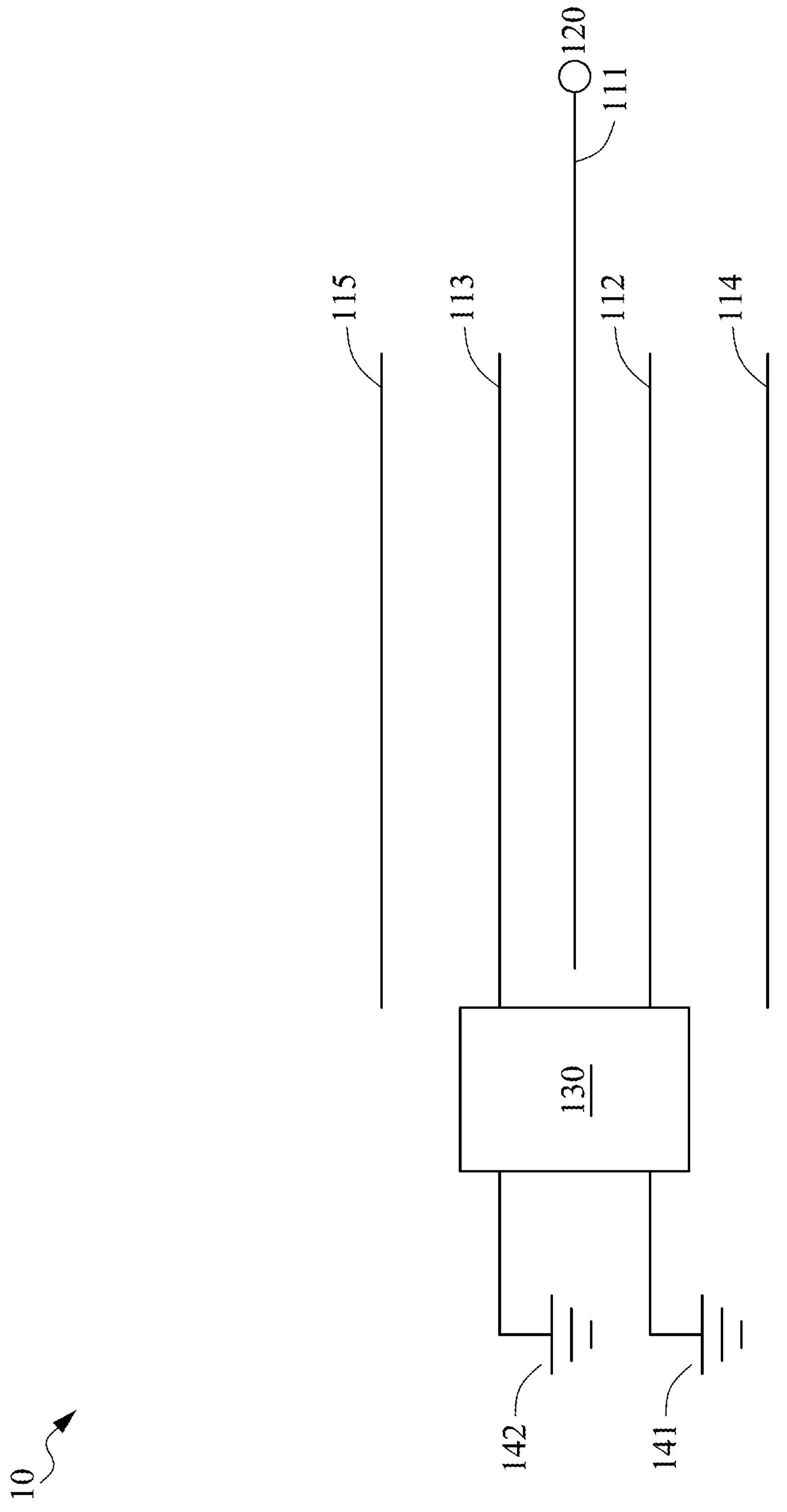
FIG. 1 illustrates a schematic view of a circuit of an antenna, in accordance with some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a schematic view of a circuit of an antenna 10, in accordance with some embodiments of the present disclosure. In some embodiments, the antenna 10 may include conductive elements 111, 112, 113, 114, and 115, a terminal 120, a switch circuit 130, as well as ground 141 and ground 142. In some embodiments, the antenna 10 may be configured to radiate and/or receive electromagnetic signals, such as radio frequency (RF) signals. For example, the antenna 10 may be configured to operate in a frequency between about 10 GHz and about 10 THz, such as 10 GHz, 50 GHz, 100 GHz, 500 GHz, 1000 GHz, 5000 GHz, or 10 THz.

In some embodiments, the conductive element 111 may function as a radiator. The conductive element 111 may be configured to transmit a signal (e.g., a feeding signal, an input signal, or an electromagnetic wave) toward the conductive element 112 and/or 113. In some embodiments, the conductive element 111 may be electrically coupled to the terminal 120, which may be electrically coupled to a signal source of a feeding signal.

The conductive elements 112 and/or 113 may be electromagnetically coupled to the conductive element 111. In some embodiments, the conductive element 112 may function as a reflector or a director, depending on whether or not the conductive element 112 is electrically coupled to a ground. In some embodiments, the conductive element 113 may function as a reflector or a director, depending on whether or not the conductive element 113 is electrically coupled to a ground. In some embodiments, when the conductive element 112 functions as a reflector, the conductive element 113 functions as a director. In some embodiments, when the conductive element 113 functions as a reflector, the conductive element 112 functions as a director. That is, both the conductive elements 112 and 113 cannot function as reflectors concurrently; both the conductive elements 112 and 113 cannot function as directors concurrently; only one of the conductive elements 112 and 113 can function as a reflector, and the other functions as a director. The reflector may be configured to be electrically coupled to a ground. The reflector may be electromagnetically coupled to a signal (e.g., a feeding signal, an input signal, or an electromagnetic wave), and thereby transmit an output signal toward the director.

Each of the conductive elements 114 and/or 115 may function as a director. The director(s) may be configured to determine the direction (or radiation direction) of the output signal. For example, when the conductive element 112 functions as a reflector, each of the conductive elements 113 and 115 may function as a director. In this condition, the conductive element 112 may be electromagnetically coupled to a signal (e.g., input signal) from the conductive element 111, and transmit a signal (e.g., output signal) to the external surrounding through the conductive elements 113 and 115, which will be described in detail in FIG. 3A, FIG. 3B, and FIG. 3C. It should be noted that although FIG. 1 illustrates that two conductive elements (e.g., 113 and 115) function as directors, the antenna 10 may include three or more directors based on required properties of the antenna 10.

The terminal 120 may be configured to transmit a signal (e.g., a feeding signal, an input signal, or an electromagnetic wave) to the conductive element 111. In some embodiments, an integrated circuit (IC), such as a radio frequency integrated circuit (RFIC), may be configured to transmit a signal (e.g., a feeding signal, an input signal, or an electromagnetic wave) to the conductive element 111.

In some embodiments, the switch circuit 130 may be configured to electrically couple the conductive element 112 to the ground 141. In some embodiments, the switch circuit 130 may be configured to electrically couple the conductive element 113 to the ground 142. In some embodiments, the switch circuit 130 may include one or more transistors, diodes, or other suitable circuits. When the conductive element 112 is electrically coupled to the ground 141, the conductive element 112 may function as a reflector. When the conductive element 113 is electrically coupled to the ground 142, the conductive element 113 may function as a reflector. Each of the grounds 141 and/or 142 may be a virtual ground or a real ground.

In this embodiment, the switch circuit 130 may be configured to electrically couple the conductive element 112 (or 113) to a ground (e.g., 141 or 142), which thereby determines the direction (or radiation direction) of an output signal of the antenna 10. It should be noted that although the ground 141 and 142 are denoted by two different reference numerals in FIG. 1, a single ground layer can function as both the ground 141 and 142 in some embodiments.

Figure 2:
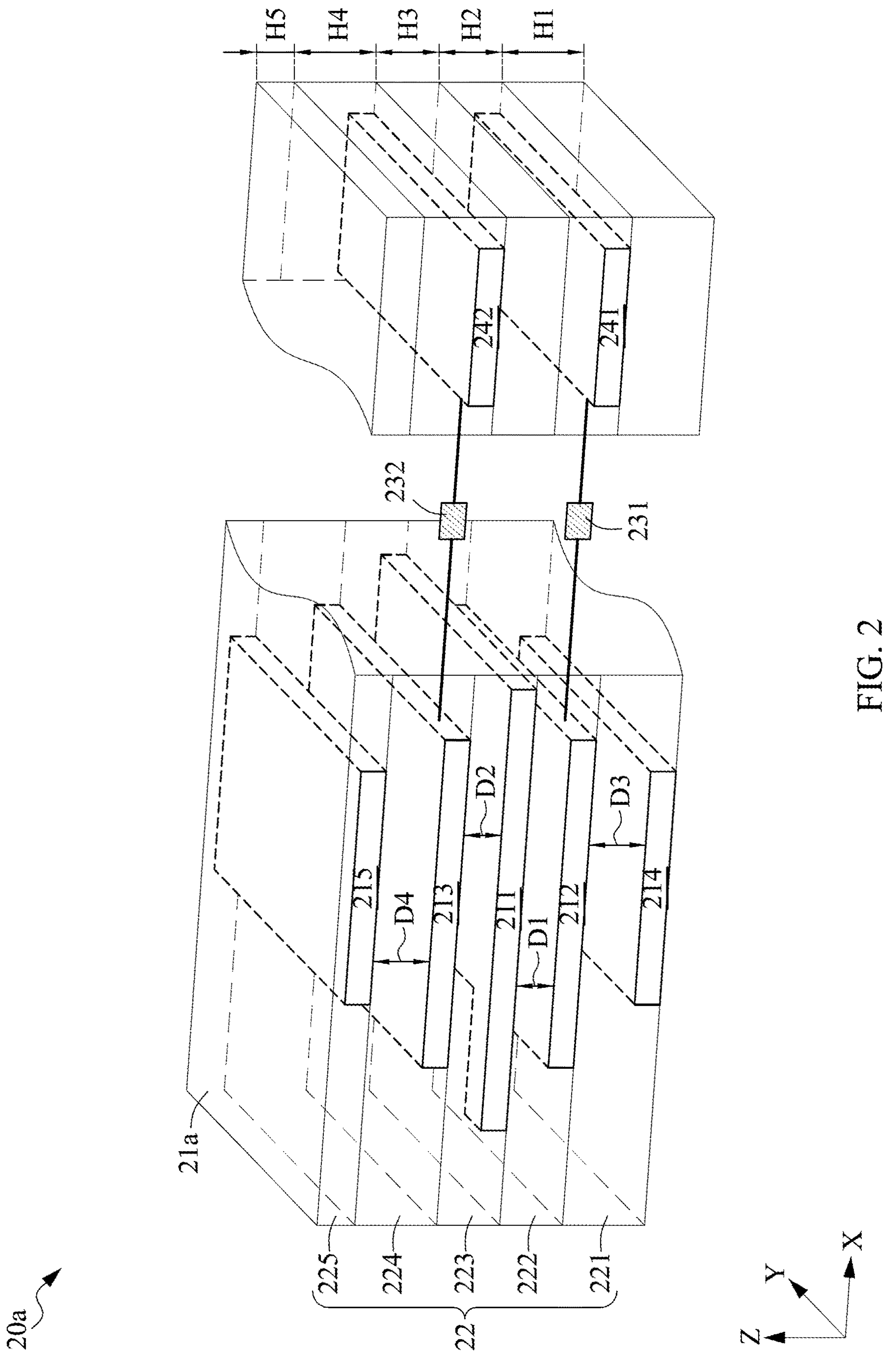
FIG. 2 is a perspective view of an electronic device, in accordance with an embodiment of the present disclosure.

FIG. 2 is a perspective view of an electronic device 20*a*, in accordance with an embodiment of the present disclosure. In some embodiments, the electronic device 20*a* may include an antenna 21*a* and a carrier 22.

The carrier 22 may include a plurality of layers, such as dielectric layers 221, 222, 223, 224, and 225. The dielectric layers 221, 222, 223, 224, and 225 may be stacked along the Z direction. Each of the dielectric layers 221, 222, 223, 224, and 225 may be located at levels (or elevations) H1, H2, H3, H4, and H5, respectively. Each of the dielectric layers 221, 222, 223, 224, and 225 may include pre-impregnated composite fibers (e.g., pre-preg), ceramic-filled polytetrafluoroethylene (PTFE) composites, or other suitable materials, such as a bismaleimide triazine (BT), polyimide (PI), polybenzoxazole (PBO), polypropylene (PP), epoxy-based material), dry-film materials or a combination thereof. In some embodiments, a dielectric constant (dk) of each of the dielectric layers 221, 222, 223, 224, and/or 225 may range from about 1 to 20, such as 1, 3, 5, 10, 15, or 20.

In some embodiments, the antenna 21*a* may be disposed within the carrier 22. In some embodiments, the antenna 21*a* may include conductive elements 211, 212, 213, 214, and 215, switches 231 and 232, as well as ground layers 241 and 242. In some embodiments, the antenna 21*a* may be configured to be applicable to an antenna circuit, such as the antenna 10 as shown in FIG. 1.

In some embodiments, the conductive element 211 may be disposed within the dielectric layer 223 and located at the level H3. The conductive element 211 may be configured to receive and/or transmit a feeding signal, such as an RF signal, toward the conductive elements 212 and/or 213. In some embodiments, the conductive element 211 may function as a radiator. In some embodiments, the conductive element 211 may be electromagnetically coupled (or electrically coupled) to an electronic component (not shown), such as an RFIC or other suitable electronic component. In some embodiments, the conductive element 211 may correspond to the conductive element 111 as shown in FIG. 1.

In some embodiments, the conductive element 212 may be disposed within the dielectric layer 222 and located at the level H2. The conductive element 212 may be electromagnetically coupled to the conductive element 211. In some embodiments, the conductive element 212 may function as a reflector or a director, depending on whether or not the conductive element 212 is electrically coupled to a ground. In some embodiments, the conductive element 212 may correspond to the conductive element 112 as shown in FIG. 1.

In some embodiments, the conductive element 213 may be disposed within the dielectric layer 224 and located at the level H4. The conductive element 213 may be electromagnetically coupled to the conductive element 211. In some embodiments, the conductive element 213 may function as a reflector or a director, depending on whether or not the conductive element 213 is electrically coupled to a ground. In some embodiments, the conductive element 213 may correspond to the conductive element 113 as shown in FIG. 1. In some embodiments, the conductive element 211 may be disposed between the conductive elements 212 and 213 along the Z direction.

In some embodiments, when the conductive element 212 functions as a reflector, the conductive element 213 functions as a director. In some embodiments, when the conductive element 213 functions as a reflector, the conductive element 212 functions as a director. The reflector may be configured to be electrically coupled to a ground. The reflector may be configured to be electrically coupled to a signal (e.g., a feeding signal, an input signal, or an electromagnetic wave) from the conductive element 211, and thereby transmit an output signal toward the director.

In some embodiments, the conductive element 214 may be disposed within the dielectric layer 221 and located at the level H1. When the conductive element 213 functions as a reflector, the conductive elements 212 and 214 may collectively function as directors. In some embodiments, the conductive element 214 may correspond to the conductive element 114 as shown in FIG. 1.

In some embodiments, the conductive element 215 may be disposed within the dielectric layer 225 and located at the level H5. When the conductive element 212 functions as a reflector, the conductive elements 213 and 215 may collectively function as directors. In some embodiments, the conductive element 215 may correspond to the conductive element 115 as shown in FIG. 1.

Each of the conductive elements 211, 212, 213, 214, and 215 may include a conductive material(s), such as copper (Cu), tungsten (W), ruthenium (Ru), iridium (Ir), nickel (Ni), osmium (Os), rhodium (Rh), aluminum (Al), molybdenum (Mo), cobalt (Co), alloys thereof, combinations thereof or any metallic materials. In some embodiments, each of the conductive elements 211, 212, 213, 214, and 215 may be located at different levels H1, H2, H3, H4, and H5, respectively. Each of the conductive elements 211, 212, 213, 214, and 215 may have different dimensions (e.g., surface area, length, and/or width), depending on required properties of the electronic device 20*a*.

The conductive elements 211 and 212 may have a distance D1 therebetween. The conductive elements 211 and 213 may have a distance D2 therebetween. The conductive elements 212 and 214 may have a distance D3 therebetween. The conductive elements 213 and 215 may have a distance D4 therebetween. In some embodiments, the distance D1 may be substantially equal to the distance D2. In some embodiments, the distance D3 may be substantially equal to the distance D4. In some embodiments, the distance D1 may be different from the distance D3. In some embodiments, the distance D1 may be less than the distance D3. In some embodiments, the ratio between the distance D1 and the distance D3 may depend on a wavelength of the signal (input signal and/or output signal) received and/or emitted from the antenna 21*a*. In some embodiments, the ratio between the distance D1 and the distance D3 may range from about 0.3 to about 0.9, such as 0.3, 0.4, 0.5, 0.6, 0.7, 0.8, or 0.9.

In some embodiments, the switch 231 may be configured to electrically couple the conductive element 212 to the ground layer 241. The switch 231 may include a transistor, a diode, other suitable circuits, or a combination thereof.

In some embodiments, the switch 232 may be configured to electrically couple the conductive element 213 to the ground layer 242. The switch 232 may include a transistor, a diode, other suitable circuits, or a combination thereof.

In some embodiments, the ground layer 241 may be disposed within the dielectric layer 222 and located at the level H2. In some embodiments, the ground layer 241 may be electrically coupled to a ground. When the switch 231 is in the on condition, the conductive element 212 is electrically coupled to a ground through the ground layer 241. When the switch 231 is in the off condition, the conductive element 212 is electrically isolated from a ground.

In some embodiments, the ground layer 242 may be disposed within the dielectric layer 224 and located at the level H4. In some embodiments, the ground layer 242 may be electrically coupled to a ground. When the switch 232 is in the on condition, the conductive element 213 is electrically coupled to a ground through the ground layer 242. When the switch 232 is in the off condition, the conductive element 213 is electrically isolated from a ground. In some embodiments, the ground layers 241 and 242 are located at different levels H2 and H4, respectively. In some embodiments, the ground layer 241 may be spaced apart from the ground layer 242. Although FIG. 2 illustrates that the electronic device 20*a* includes two ground layers 241 and 242, the electronic device 20*a* may include a single ground layer which may be electrically connected to either the conductive element 212, the conductive element 214, or the both in other embodiments. Such single ground layer may be located at levels H1, H2, H3, H4, or H5.

Figure 3A:
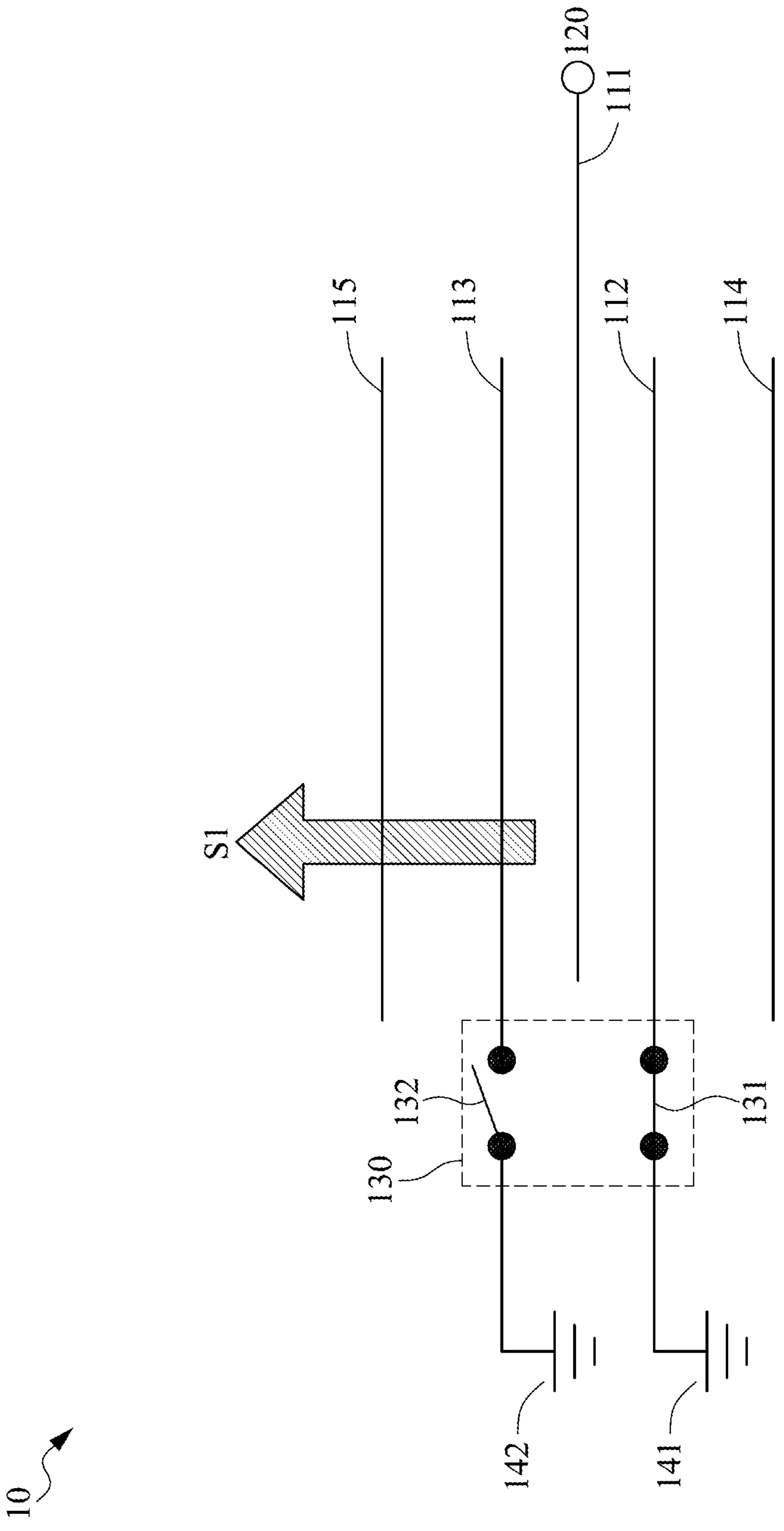
FIG. 3A illustrates an operation mode of the antenna as shown in FIG. 1A, in accordance with some embodiments of the present disclosure.
Figure 3B:
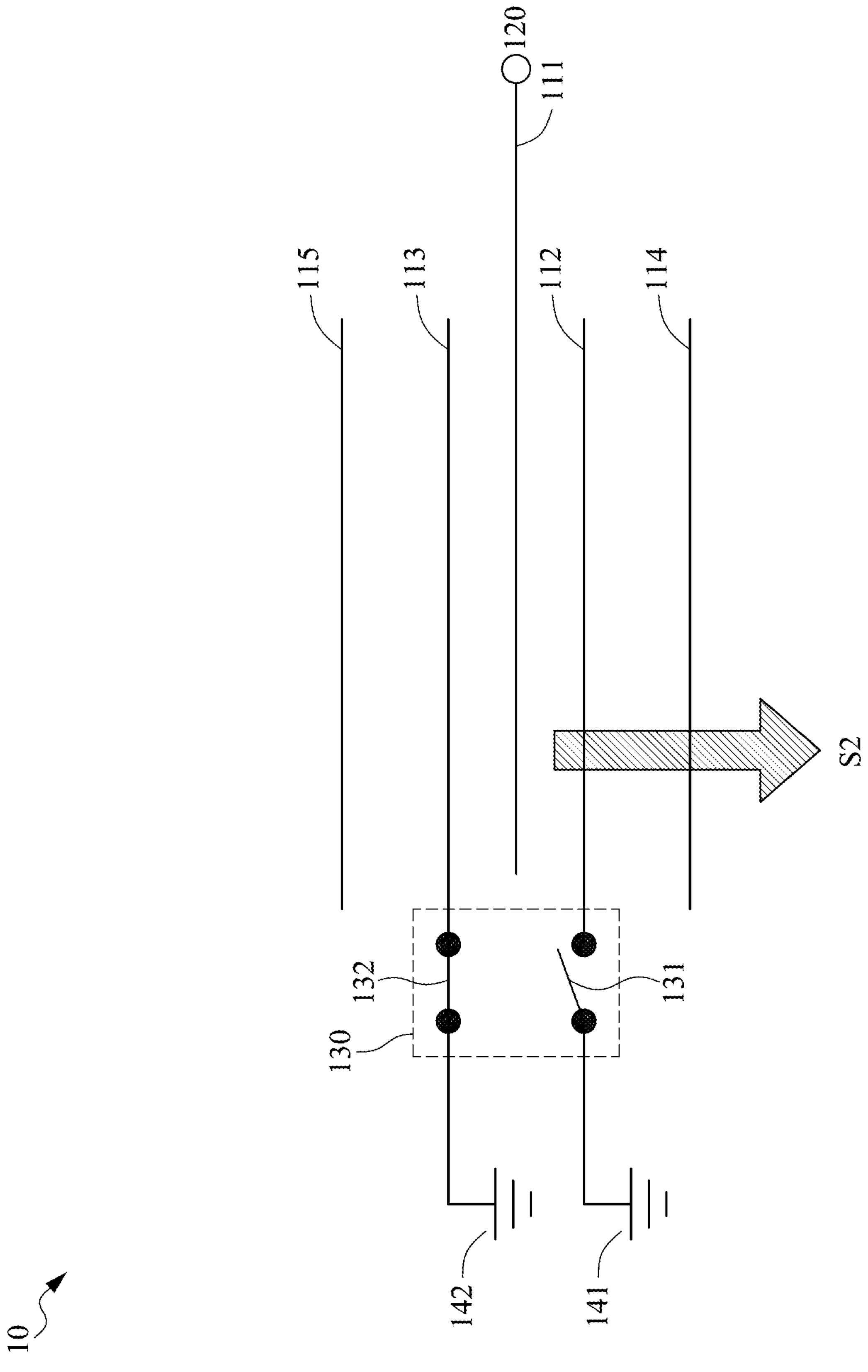
FIG. 3B illustrates an operation mode of the antenna as shown in FIG. 1A, in accordance with some embodiments of the present disclosure.
Figure 3C:
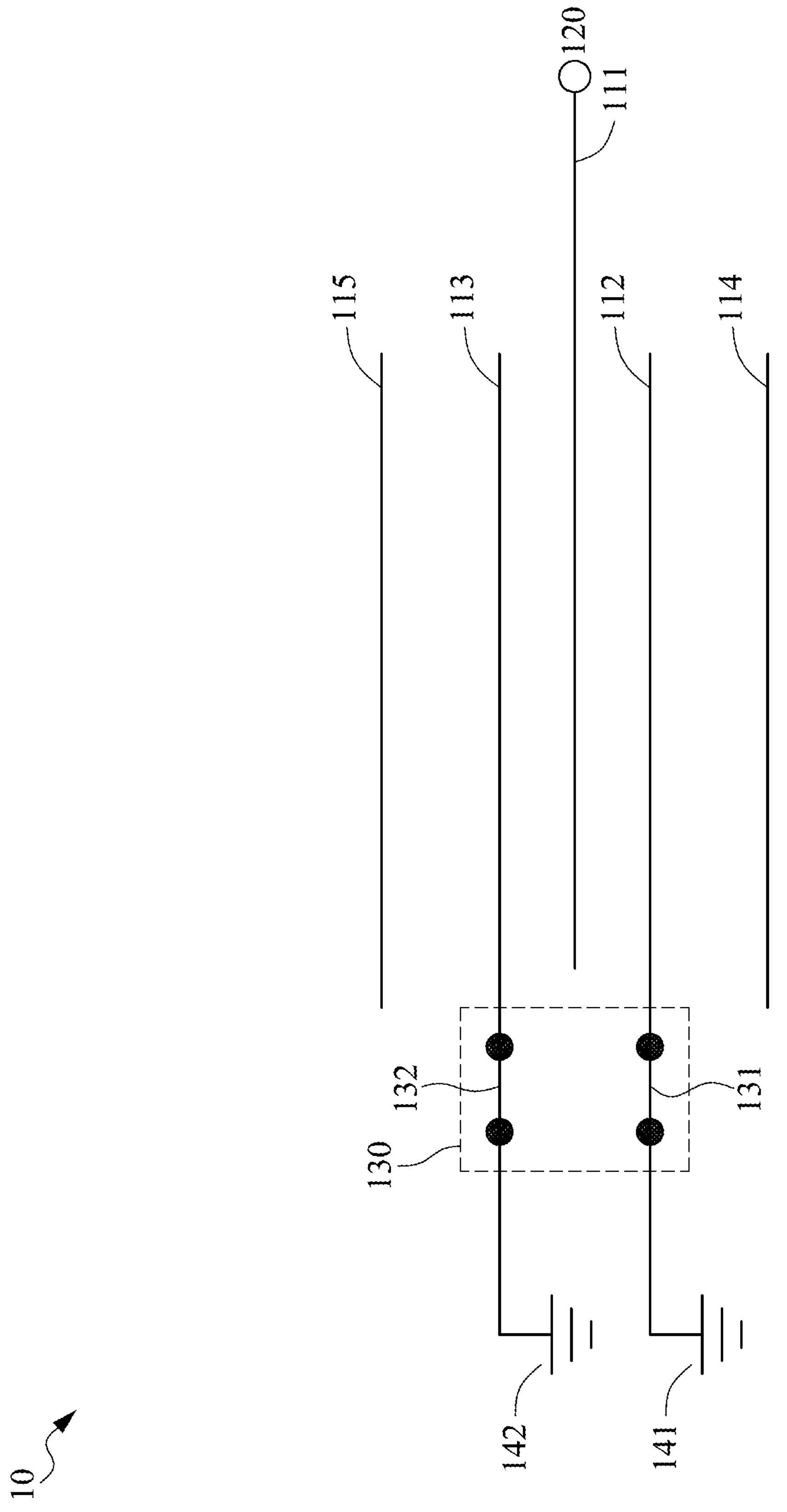
FIG. 3C illustrates an operation mode of the antenna as shown in FIG. 1A, in accordance with some embodiments of the present disclosure.

FIG. 3A, FIG. 3B, and FIG. 3C illustrate different operation modes of the antenna 10 as shown in FIG. 1A, in accordance with some embodiments of the present disclosure.

In some embodiments, the switch 130 may include switches 131 and 132. The switch 131 may be configured to electrically couple the conductive element 112 to the ground 141. The switch 132 may be configured to electrically couple the conductive element 113 to the ground 142.

As shown in FIG. 3A, when the switch 131 is in the on condition, the conductive element 112 is electrically coupled to the ground 141. The conductive element 112 may function as a reflector. The switch 132 is in the off condition, and the conductive elements 113 and 115 collectively function as directors. A signal S1 (or an output signal) is transmitted along a direction from the conductive element 112 (or the reflector) toward the conductive element 113 (or the director).

As shown in FIG. 3B, when the switch 132 is in the on condition, the conductive element 113 is electrically coupled to the ground 142. The conductive element 113 may function as a reflector. The switch 131 is in the off condition, and the conductive elements 112 and 114 collectively function as directors. A signal S2 (or an output signal) is transmitted along a direction from the conductive element 113 (or the reflector) toward the conductive element 112 (or the director). In some embodiments, the signal S1 is transmitted along a direction opposite to that of the signal S2.

As shown in FIG. 3C, when both the switches 131 and 132 are in the on condition, the conductive element 112 is electrically coupled to the ground 141, and the conductive element 113 is electrically coupled to the ground 142. No signal is transmitted from the antenna 10 toward the external surrounding.

In this embodiment, the signal direction from the antenna 10 may be controlled by the switch circuit 130. In some embodiments, each of the switches 131 and 132 may be in the on and/or off conditions at a predetermined time interval, and the signals of the antenna 10 may be transmitted along, for example, the +Z direction and −Z direction based on the predetermined time interval. As a result, the signals S1 and S2 as shown in FIG. 3A and FIG. 3B may be switched promptly and free from being influenced by each other.

Figure 4:
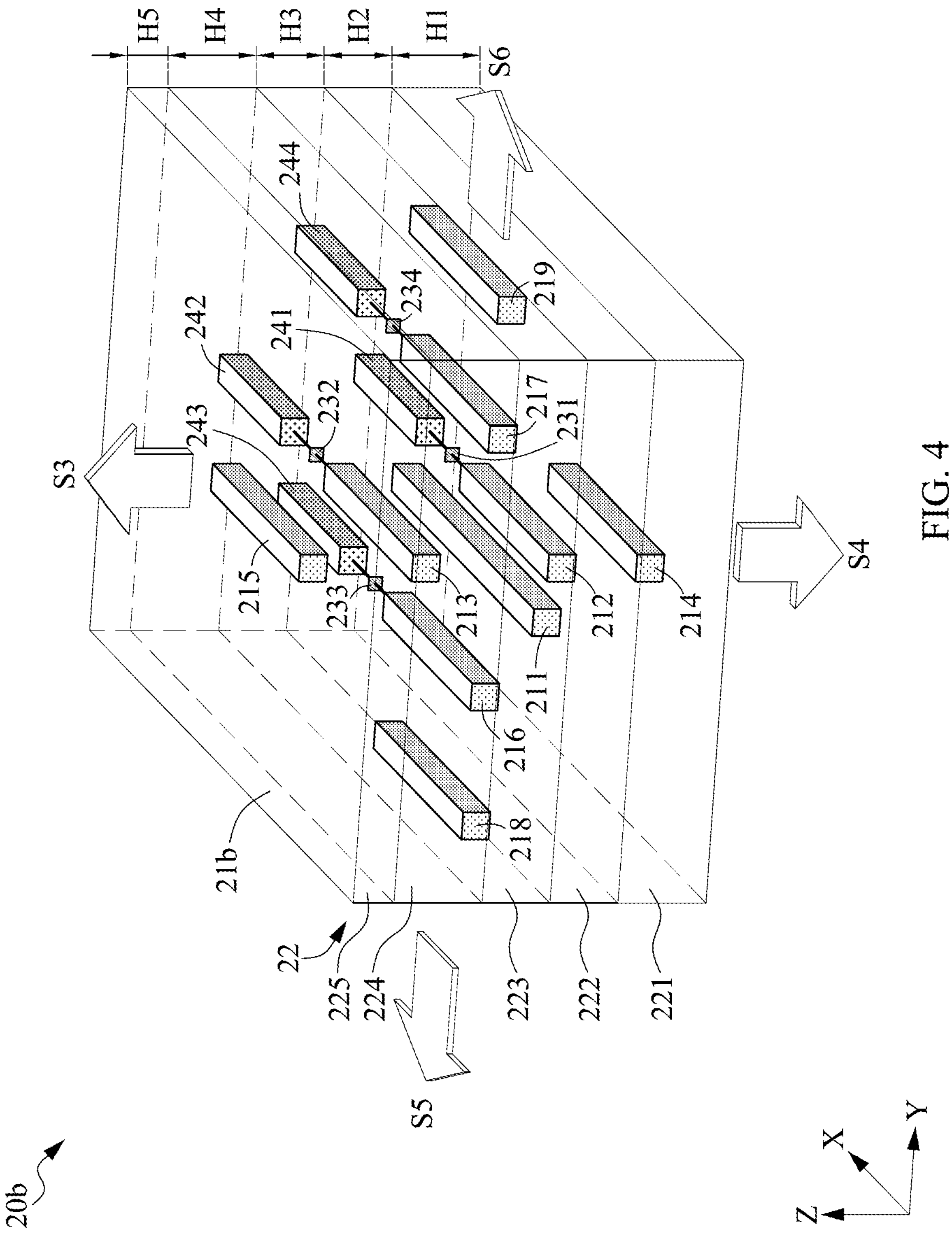
FIG. 4 is a perspective view of an electronic device, in accordance with an embodiment of the present disclosure.

FIG. 4 is a perspective view of an electronic device 20*b*, in accordance with an embodiment of the present disclosure. The electronic device 20*b* is similar to the electronic device 20*a* as shown in FIG. 2, and the differences therebetween are described below.

In some embodiments, the electronic device 20*b* may include an antenna 21*b*. The antenna 21*b* may be disposed within the carrier 22. In some embodiments, the antenna 21*b* may further include conductive elements 216, 217, 218, and 219, switches 233 and 234, as well as ground layers 243 and 244.

In some embodiments, the conductive element 216 may be disposed within the dielectric layer 223 and located at the level H3. The conductive element 216 may be electromagnetically coupled to the conductive element 211. In some embodiments, the conductive element 216 may function as a reflector or a director, depending on whether or not the conductive element 216 is electrically coupled to a ground.

In some embodiments, the conductive element 217 may be disposed within the dielectric layer 223 and located at the level H3. In some embodiments, the conductive element 211 may be disposed between the conductive elements 216 and 217 along the Y direction. The conductive element 217 may be electromagnetically coupled to the conductive element 211. In some embodiments, the conductive element 217 may function as a reflector or a director, depending on whether or not the conductive element 217 is electrically coupled to a ground.

In some embodiments, when the conductive element 216 functions as a reflector, the conductive element 217 functions as a director. In some embodiments, when the conductive element 217 functions as a reflector, the conductive element 216 functions as a director.

In some embodiments, the conductive element 218 may be disposed within the dielectric layer 223 and located at the level H3. When the conductive element 217 functions as a reflector, the conductive elements 216 and 218 may collectively function as directors.

In some embodiments, the conductive element 219 may be disposed within the dielectric layer 223 and located at the level H3. When the conductive element 216 functions as a reflector, the conductive elements 217 and 219 may collectively function as directors.

In some embodiments, the arrangement direction of the conductive elements 212, 213, 214 and 215 may be different from the arrangement direction of the conductive elements 216, 217, 218 and 219. For example, the conductive elements 212 may be aligned with the conductive elements 213 along the Z direction. In some embodiments, the arrangement direction of the conductive elements 212, 213, 214 and 215 may be substantially perpendicular to the arrangement direction of the conductive elements 216, 217, 218 and 219. For example, the conductive elements 216 may be aligned with the conductive elements 217 along the Y direction.

In some embodiments, the switch 233 may be configured to electrically couple the conductive element 216 to the ground layer 243. The switch 233 may include a transistor, a diode, other suitable circuits, or a combination thereof.

In some embodiments, the switch 234 may be configured to electrically couple the conductive element 217 to the ground layer 244. The switch 234 may include a transistor, a diode, other suitable circuits, or a combination thereof.

In some embodiments, the ground layer 243 may be disposed within the dielectric layer 223 and located at the level H3. In some embodiments, the ground layer 243 may be electrically coupled to a ground. When the switch 233 is in the on condition, the conductive element 216 is electrically coupled to a ground through the ground layer 243. When the switch 233 is in the off condition, the conductive element 216 is electrically isolated from a ground.

In some embodiments, the ground layer 244 may be disposed within the dielectric layer 223 and located at the level H3. In some embodiments, the ground layer 244 may be electrically coupled to a ground. When the switch 234 is in the on condition, the conductive element 217 is electrically coupled to a ground through the ground layer 244. When the switch 234 is in the off condition, the conductive element 217 is electrically isolated from a ground.

In some embodiments, the ground layers 241, 242, 243, and 244 may be spaced apart from each other. In some embodiments, the ground layers 243 and 244 may be located at the same level H3. In some embodiments, the ground layers 241 and 243 may be located at different levels H2 and H3, respectively. In some embodiments, the ground layer 241 may be aligned with the ground layer 242 along the Z direction. In some embodiments, the ground layer 243 may be aligned with the ground layer 244 along the Y direction. In some embodiments, the ground layer 241 may be free from overlapping the ground layer 243 (or 244) along the X direction. In some embodiments, the ground layer 241 may be free from overlapping the ground layer 243 (or 244) along the Y direction. In some embodiments, the ground layer 241 may be free from overlapping the ground layer 243 (or 244) along the Z direction. In some embodiments, the ground layer 242 may be free from overlapping the ground layer 243 (or 244) along the X direction. In some embodiments, the ground layer 242 may be free from overlapping the ground layer 243 (or 244) along the Y direction. In some embodiments, the ground layer 242 may be free from overlapping the ground layer 243 (or 244) along the Z direction.

As shown in FIG. 4, the antenna 21*b* may transmit signals S3, S4, S5, and S6 along different directions. For example, the signal S3 may be transmitted along the +Z direction when the switch 231 is in the on condition and the switch 232 is in the off condition. The signal S4 may be transmitted along the −Z direction when the switch 232 is in the on condition and the switch 231 is in the off condition. The signal S5 may be transmitted along the −Y direction when the switch 234 is in the on condition and the switch 233 is in the off condition. The signal S6 may be transmitted along the +Y direction when the switch 233 is in the on condition and the switch 234 is in the off condition.

In some embodiments, the operation of the switch 231 is independent from the switch 233 (or 234). In some embodiments, both the switches 231 and 233 (or 234) may be in the on condition. In some embodiments, the signals S3 and S5 (or S6) may be transmitted concurrently. In some embodiments, both the switches 231 and 233 (or 234) may be in the off condition. In some embodiments, the signal S3 may be transmitted along a first direction, and the signal S5 may be transmitted along a second direction substantially perpendicular to the first direction. In some embodiments, the signal S3 may be transmitted along a first direction, and the signal S6 may be transmitted along a second direction substantially perpendicular to the first direction. In some embodiments, the signal S4 may be transmitted along a first direction, and the signal S5 may be transmitted along a second direction substantially perpendicular to the first direction. In some embodiments, the signal S4 may be transmitted along a first direction, and the signal S6 may be transmitted along a second direction substantially perpendicular to the first direction.

In some embodiments, the operation of the switch 232 is independent from the switch 233 (or 234). In some embodiments, both the switches 232 and 233 (or 234) may be in the on condition. In some embodiments, the signals S4 and S5 (or S6) may be transmitted concurrently. In some embodiments, both the switches 231 and 233 (or 234) may be in the off condition.

In some embodiments, the signals S3 and S4 cannot be transmitted concurrently. In some embodiments, the signals S5 and S6 cannot be transmitted concurrently.

In some embodiments, each of the switches 131, 132, 133 and 134 may be in the on and/or off conditions at a predetermined time interval, and the signals S3, S4, S5, and S6 of the antenna 21*b* may be transmitted based on the predetermined time interval. As a result, the signals S3, S4, S5, and S6 may be switched promptly and free from being influenced by each other.

Figure 5:
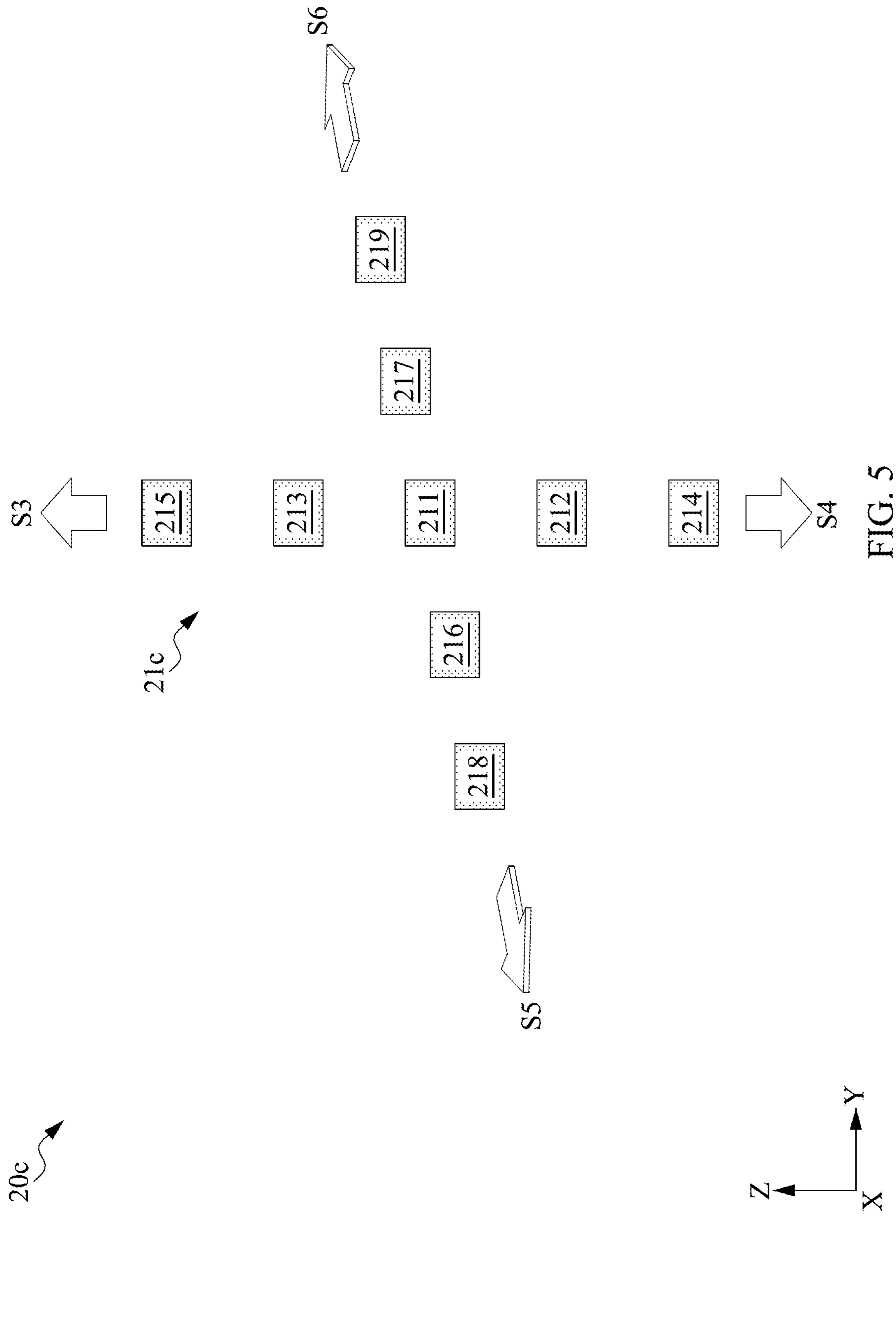
FIG. 5 is a schematic view of an electronic device, in accordance with an embodiment of the present disclosure.

FIG. 5 is a schematic view of an electronic device 20*c*, in accordance with an embodiment of the present disclosure.

The electronic device 20*c* is similar to the electronic device 20*b* as shown in FIG. 4, and the differences therebetween are described below.

The electronic device 20*c* may include an antenna 21*c*. In some embodiments, the arrangement direction of the conductive elements 212, 213, 214 and 215 may be not perpendicular to the arrangement direction of the conductive elements 216, 217, 218 and 219. In some embodiments, the arrangement direction of the conductive elements 212, 213, 214 and 215 may be slanted with respect to the arrangement direction of the conductive elements 216, 217, 218 and 219. For example, the conductive elements 212, 213, 214 and 215 may be arranged along the Z direction, and the conductive elements 216, 217, 218 and 219 may be arranged along a direction slanted with respect to both the Y direction and the Z direction. In this embodiment, the signal S5 (or S6) may be transmitted along a direction slanted with respect to that of the signal S3.

Figure 6:
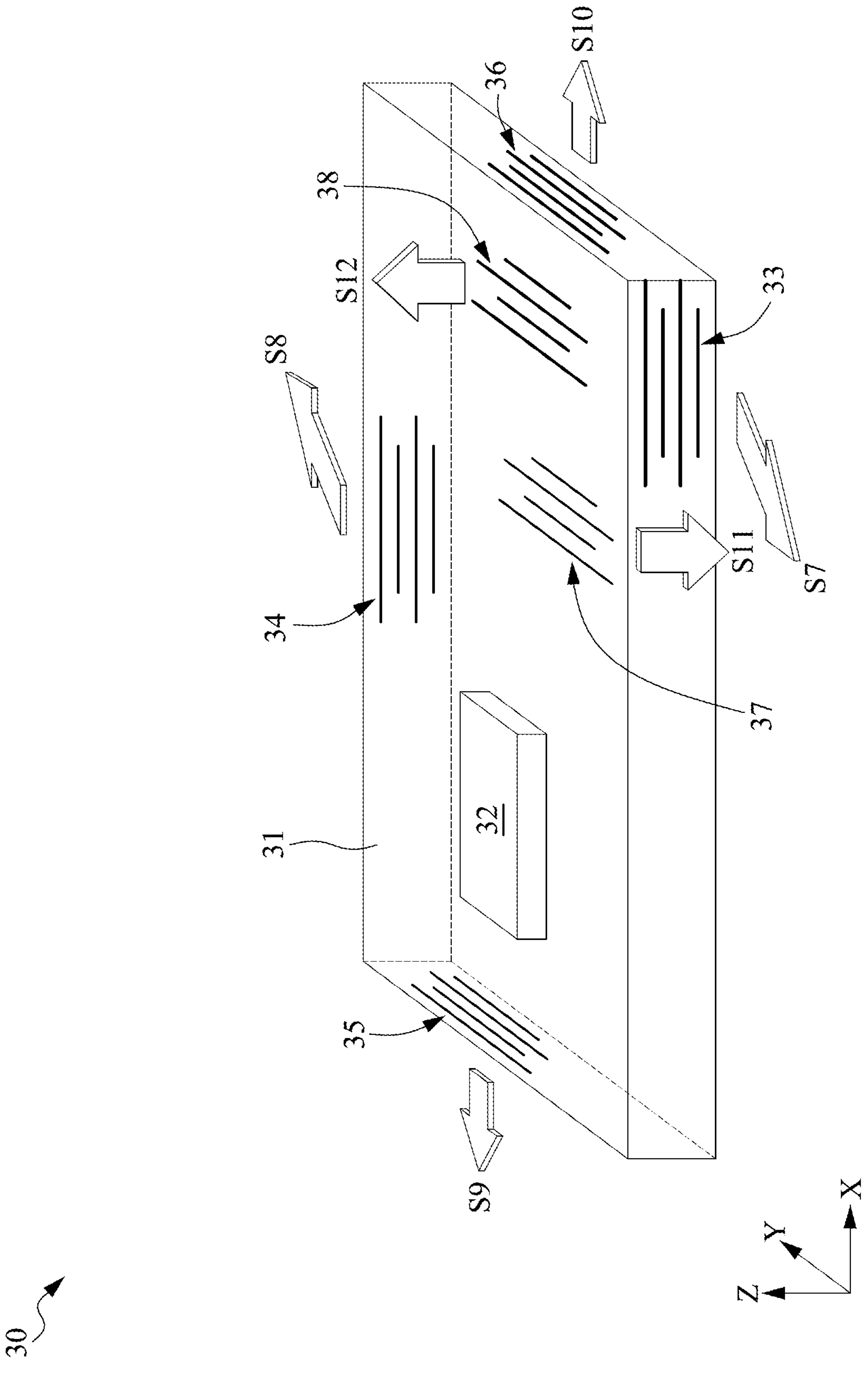
FIG. 6 is a perspective view of an electronic device, in accordance with an embodiment of the present disclosure.

FIG. 6 is a perspective view of an electronic device 30, in accordance with an embodiment of the present disclosure. In some embodiments, the electronic device 30 may include a carrier 31, an electronic component 32, and antenna units 33, 34, 35, 36, 37, and 38.

In some embodiments, the carrier 31 may include, for example, a printed circuit board (PCB), such as a paper-based copper foil laminate, a composite copper foil laminate, or a polymer-impregnated glass-fiber-based copper foil laminate. In some embodiments, the carrier 31 may include a redistribution structure (not shown) for electrically coupling the electronic component 32 and other components (e.g., antenna units 33, 34, 35, 36, 37, and/or 38).

The electronic component 32 may be disposed over or disposed on an external surface (not annotated) of the carrier 31. The electronic component 32 may be a chip or a die including a semiconductor substrate, one or more integrated circuit (IC) devices and one or more overlying interconnection structures therein. The IC devices may include active devices such as transistors and/or passive devices such as resistors, capacitors, inductors, or a combination thereof. For example, the electronic component 32 may include a system on chip (SoC). For example, the electronic component 32 may include an RFIC, an application-specific IC (ASIC), a central processing unit (CPU), a microprocessor unit (MPU), a graphics processing unit (GPU), a microcontroller unit (MCU), a field-programmable gate array (FPGA), or another type of IC.

Each of the antenna units 33, 34, 35, 36, 37, and 38 may be disposed within the carrier 31. In some embodiments, each of the antenna units 33, 34, 35, 36, 37, and 38 may be configured to function as an antenna, such as the antenna 10 as shown in FIG. 1. Each of the antenna units 33, 34, 35, 36, 37, and 38 may include a set of a radiator, a reflector(s), and a director(s), such as the conductive elements 111, 112, 113, 114, and 115 as shown in FIG. 1. The antenna units 33, 34, 35, 36, 37, and 38 may have different arrangement directions of the radiator, reflector(s), and director(s) so that the signals S7, S8, S9, S10, S11, and S12 may be transmitted toward different directions.

In some embodiments, each of the antennas 21*a*, 21*b*, 21*c* as well as antenna units 33, 34, 35, 36, 37, and 38 may be applicable to a Yagi-Uda antenna, a patch antenna, or other types of antenna.

In this embodiment, the electronic component 32 may be configured to control the switch (not shown in FIG. 6) to electrically couple a ground and a reflector of the antenna units 33, 34, 35, 36, 37, and/or 38, to thereby determine the direction (or radiation direction) of the signal(s). For example, the electronic component 32 may be configured to determine that the signal is emitted toward the +X direction, −X direction, +Y direction, −Y direction, +Z direction, and −Z direction.

In a comparative example, a circuit board (or carrier) is bent so that the antenna can emit signals toward different directions. However, a bent circuit board has an adverse effect on miniaturization of electronic devices. In this embodiment, a switch circuit may be used to determine the directions of the signals of the antenna. Further, it does not need to bend the carrier, which thereby facilitates the miniaturization of electronic devices.

Figure 7:
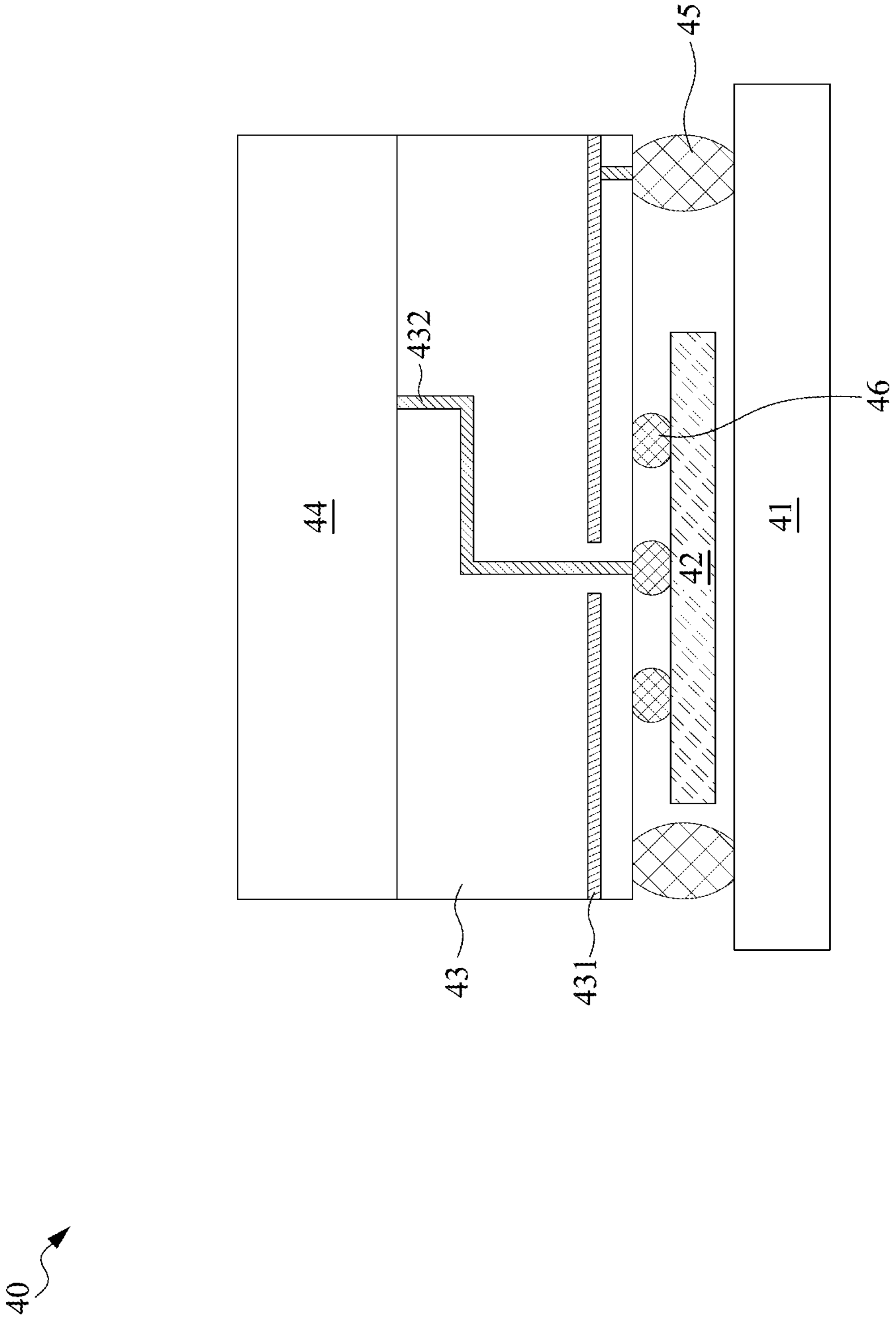
FIG. 7 is a cross-sectional view of an electronic device, in accordance with an embodiment of the present disclosure.

FIG. 7 is a cross-sectional view of an electronic device 40, in accordance with an embodiment of the present disclosure. In some embodiments, the electronic device 40 may include a circuit structure 41, an electronic component 42, a redistribution structure 43, and an antenna device 44.

The circuit structure 41 may include, for example, a printed circuit board (PCB), such as a paper-based copper foil laminate, a composite copper foil laminate, or a polymer-impregnated glass-fiber-based copper foil laminate.

The electronic component 42 may be disposed on the redistribution structure 43. In some embodiments, the electronic component 42 may be disposed between the circuit structure 41 and the redistribution structure 43. In some embodiments, the electronic component 42 may be configured to transmit a signal (e.g., RF signal) to the antenna device 44. The electronic component 42 may be a chip or a die including a semiconductor substrate, one or more IC devices and one or more overlying interconnection structures therein. The IC devices may include active devices such as transistors and/or passive devices such as resistors, capacitors, inductors, or a combination thereof. For example, the electronic component 42 may include an SoC, RFIC, ASIC, CPU, MPU, GPU, MCU, FPGA, or another type of IC.

The redistribution structure 43 may be disposed over or disposed on the circuit structure 41. The redistribution structure 43 may include a conductive pad(s), trace(s), via(s), layer(s), or other interconnection(s). For example, the redistribution structure 43 may include one or more transmission lines (e.g., communications cables) and one or more grounding lines and/or grounding planes. For example, the redistribution structure 43 may include one or more conductive pads in proximity to, adjacent to, or embedded in and exposed at the upper surface and lower surface (not annotated) of the redistribution structure 43. The redistribution structure 43 may include conductive traces 431 and 432.

The conductive trace 431 may be configured to transmit a power signal to the electronic component 42. In some embodiments, the conductive trace 431 may be electrically connected to the ground or function as a ground layer. The conductive trace 431 may be electrically coupled to, for example, a power management integrated circuit (PMIC) or other suitable electronic components.

The conductive trace 432 may be configured to electrically couple the electronic component 42 and the antenna device 44.

In some embodiments, the antenna device 44 may include one or more antenna units. In some embodiments, the antenna device 44 may include elements the same as or similar to those of the antennas 10, 21*a*, 21*b*, 21*c*, and/or 30.

The electronic device 40 may further include electrical connections 45. In some embodiments, the electrical connection 45 may be configured to electrically connect the circuit structure 41 and the redistribution structure 43. In some embodiments, the electrical connections 45 may include a solder ball, which may include lead or may be lead-free (e.g., including one or more materials such as alloys of gold and tin solder or alloys of silver and tin solder).

The electronic device 40 may further include electrical connections 46. In some embodiments, the electrical connection 46 may be configured to electrically connect the electronic component 42 and the redistribution structure 43. In some embodiments, the electrical connection 46 may include a solder ball, which may include lead or may be lead-free (e.g., including one or more materials such as alloys of gold and tin solder or alloys of silver and tin solder).

Spatial descriptions, such as "above," "below," "up," "left," "right," "down," "top," "bottom," "vertical," "horizontal," "side," "higher," "lower," "upper," "over," "under," and so forth are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," and "an" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:

an antenna, comprising:

a first conductive element configured to transmit a first signal along a first direction;

a second conductive element configured to transmit a second signal along a second direction nonparallel to the first direction;

a switch circuit configured to electrically couple a ground to the first conductive element and/or the second conductive element, wherein the first conductive element is located at a first level, and the second conductive element is located at a second level different from the first level along the second direction, the first conductive element functions as a first director, and the second conductive element functions as a second director;

a first reflector, wherein the first reflector and the first director are configured to transmit the first signal;

a second reflector, wherein the second reflector and the second director are configured to transmit the second signal, and a pair of the first reflector and the first director is distinct from a pair of the second reflector and the second director.

2. The electronic device of claim 1, wherein the first direction is slanted with respect to the second direction.

3. The electronic device of claim 1, further comprising:

a radiator configured to be electrically coupled to the first reflector, the first director, the second director, and the second reflector.

4. The electronic device of claim 3, wherein the radiator, first reflector, and first director are arranged along the first direction, and the radiator, the second reflector, and the second director are arranged along the second direction.

5. The electronic device of claim 1, wherein the first reflector is located at the first level, and the second reflector is located at a third level different from the first level and from the second level along the second direction.

6. The electronic device of claim 5, further comprising:

a first ground layer electrically coupled to the first reflector; and a second ground layer electrically coupled to the second reflector, wherein the first ground layer is at the first level, and the second ground layer is at the third level.

7. An electronic device, comprising:

a first conductive element configured to function as a first reflector or a first director;

a second conductive element configured to function as a second reflector or a second director, wherein when the first conductive element functions as the first reflector, the second conductive element functions as the second director, and when the second conductive element functions as the second reflector, the first conductive element functions as the first director; and a third conductive element distinct from the first conductive element and the second conductive element, wherein the third conductive element is configured to function as a third reflector or a third director;

a first dielectric layer within which the first conductive element and the second conductive element are disposed; and a second dielectric layer within which the third conductive element is disposed.

8. The electronic device of claim 7, further comprising:

a fourth conductive element configured to function as a fourth reflector or a fourth director, wherein the fourth conductive element is located at a level different from that of the first conductive element and that of the third conductive element.

9. The electronic device of claim 8, wherein the third conductive element and the fourth conductive element are located at opposite sides of the first conductive element.

10. The electronic device of claim 7, further comprising:

a fourth conductive element configured to function as a fourth reflector or a fourth director, wherein when the third conductive element functions as the third reflector, the fourth conductive element functions as the fourth director, and when the fourth conductive element functions as the fourth reflector, the third conductive element functions as the third director, and wherein the fourth conductive element is disposed within a third dielectric layer, and the first dielectric layer is disposed between the second dielectric layer and the third dielectric layer.

11. The electronic device of claim 10, further comprising:

a radiator configured to be coupled to the first conductive element, the second conductive element, the third conductive element, and the fourth conductive element, wherein the radiator is disposed within the first dielectric layer.

12. The electronic device of claim 7, further comprising:

a first switch configured to electrically couple the first conductive element to a first ground layer; and a second switch configured to electrically couple the third conductive element to a second ground layer, wherein a first operation of the first switch is independent from a second operation of the second switch.

13. The electronic device of claim 12, wherein the first operation comprises turning on the first switch, and the second operation comprises turning on the second switch.

14. The electronic device of claim 12, wherein the first operation is configured to transmit a first signal along a first direction, the second operation is configured to transmit a second signal along a second direction nonparallel to the first direction, and wherein the first conductive element and the second conductive element are located at a first level, and the third conductive element is located at a second level different from the first level along the second direction.

15. The electronic device of claim 12, further comprising;

a fourth conductive element configured to function as a fourth reflector or a fourth director; and a third switch configured to electrically couple the fourth conductive element to a third ground layer, and a third operation is configured to turning on the third switch, and wherein the first operation is configured to transmit a first signal along a first direction, the second operation is configured to transmit a second signal along a second direction nonparallel to the first direction, and the third operation is configured to transmit a third signal along a third direction nonparallel to the first direction and to the second direction.

16. An electronic device, comprising:

a carrier;

an antenna disposed within the carrier, wherein the antenna comprises a first conductive element and a second conductive element configured to transmit a first signal along the first direction;

a third conductive element and a fourth conductive element configured to transmit a second signal along the second direction; and a fifth conductive element and a sixth conductive element configured to transmit a third signal along the third direction; and an electronic component electrically coupled to the antenna and configured to determine that a radiation direction of an electromagnetic wave from the antenna, wherein the radiation directions comprises a first direction, a second direction, and a third direction nonparallel to each other.

* * * * *